June 24, 1969 — W. L. STOVER ET AL — 3,451,244
AUTOMATIC WORK ROLL CHANGERS
Filed Jan. 26, 1967 — Sheet 1 of 5

INVENTORS
WILLIAM L. STOVER
ANDREW J. PETROS
BY
ATTORNEYS

INVENTORS
WILLIAM L. STOVER
ANDREW J. PETROS

ATTORNEYS

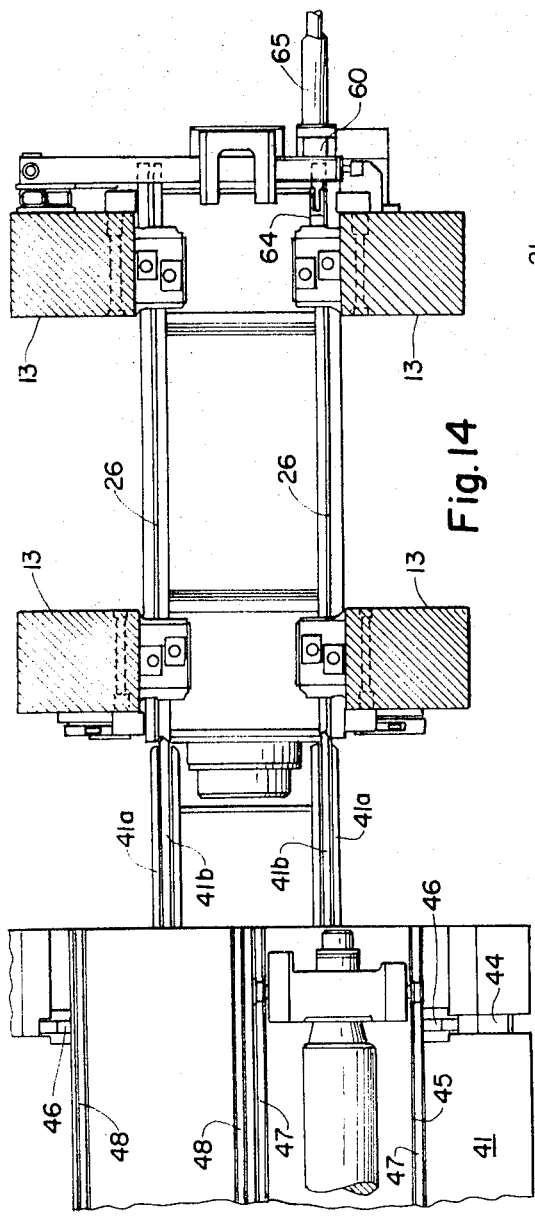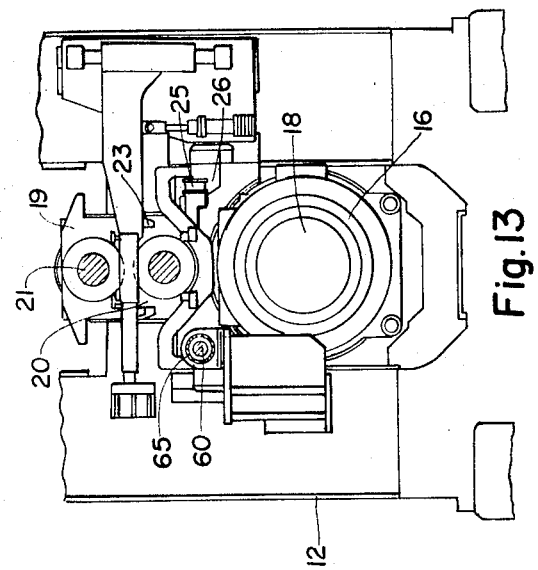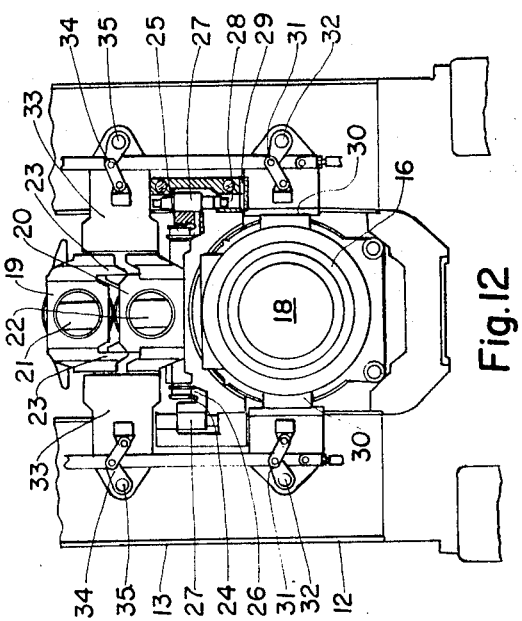

United States Patent Office 3,451,244
Patented June 24, 1969

3,451,244
AUTOMATIC WORK ROLL CHANGERS
William L. Stover and Andrew J. Petros, Oakdale, Pa.,
assignors to Mesta Machine Company, Pittsburgh, Pa.,
a corporation of Pennsylvania
Filed Jan. 26, 1967, Ser. No. 611,959
Int. Cl. B21b 31/10
U.S. Cl. 72—239                                    2 Claims

ABSTRACT OF THE DISCLOSURE

This invention relates to automatic work roll changers for rolling mills having a mill housing with end frames on opposite sides of a pass line, each end framing having a window adapted to receive the chocks of a pair of work rolls on roll carrier means movable on rails extending transversely of the pass line and vertically movable in said windows, a track adjacent the housing parallel to the pass line having a buggy movable thereon and provided with side by side railways each adapted to receive a roll carrier means and rolls thereon and means driving each of the buggy means and roll carrier means.

---

This invention relates to automatic work roll changers and particularly to devices for automatically changing work rolls in four high metal rolling mills. The invention is particulalry useful for automatically changing more than one stand of tandem mills simultaneously.

In the rolling of metals it is common to use four high mills, usually in tandem, for the production of sheet and strip products. Such mills are generally run at very high speeds, resulting in large tonnages of product in a relatively short time. However, it is frequently necessary to change the work rolls, either because of a change in type of product desired, a change in the feed material or because of the condition of the rolls. In the past these changes have been made using overhead cranes with considerable manual labor involved. This practice results in excessive down time for the mills and a consequent loss of productivity.

In order to achieve the maximum usefulness and productivity from such mills it is necessary to be able efficiently and quickly to change the work rolls of these mills.

The present invention eliminates the need for overhead cranes and manual labor in changing work rolls in such mills and significantly reduces the down time of the mill as well as eliminating the hazards which normally are present when men are required to handle heavy rolls.

Preferably we provide a mill housing having end frames on opposite sides of a pass line, each end frame having a window adapted to receive the chocks of a pair of work rolls and the chocks of upper and lower back up rolls, a rail at each side of said windows extending transversely of the pass line and slidable vertically thereto, means in said housing for vertically moving said rails, roll carrier means movable on said rails, a pair of work rolls supported at their chocks on said roll carrier means, horizontally movable clamp means at each edge of each window selectively engaging the chocks of both work rolls, track means adjacent the housing parallel to said pass line, buggy means on said track means, movable thereon, two sets of rails spaced apart on said buggy means, each set of rails corresponding in spacing to the rails in said housing windows and adapted to be aligned with said rails at their highest position, means for driving said buggy and roll moving means adjacent said housing engaging said rolls to move said rolls between a position within said housing to a position on one of said two sets of rails. Preferably the track means and buggy means are mounted on a roll transfer car movable transversely to the pass line from a position adjacent the housing to a position spaced therefrom and drive means on said transfer car for moving said car transversely to said pass line. In a preferred embodiment of our invention, we provide a floor section adjacent the housing movable from a position in the plane of the surrounding general floor to a position in a plane below the general floor and means for retracting said floor section away from the housing. Preferably sequential control apparatus is provided for energizing each successive motion of the foregoing parts.

In the foregoing general description we have set out certain objects, purposes and advantages of our invention. Other objects, purposes and advantages will be apparent from a consideration of the following description and the accompanying drawings in which:

FIGURE 12 is a fragmentary and elevation of a mill housing as used in FIGURE 1 partly in section viewed from the work end;

FIGURE 13 is a fragmentary end elevation of the mill housing of FIGURE 12 partly in section viewed from the drive end; and FIGURE 14 is a fragmentary top plan view of a mill housing, partly broken away, as used in FIGURE 1 showing the relative position of the housing and transfer car during the changing operation.

Figure 1:
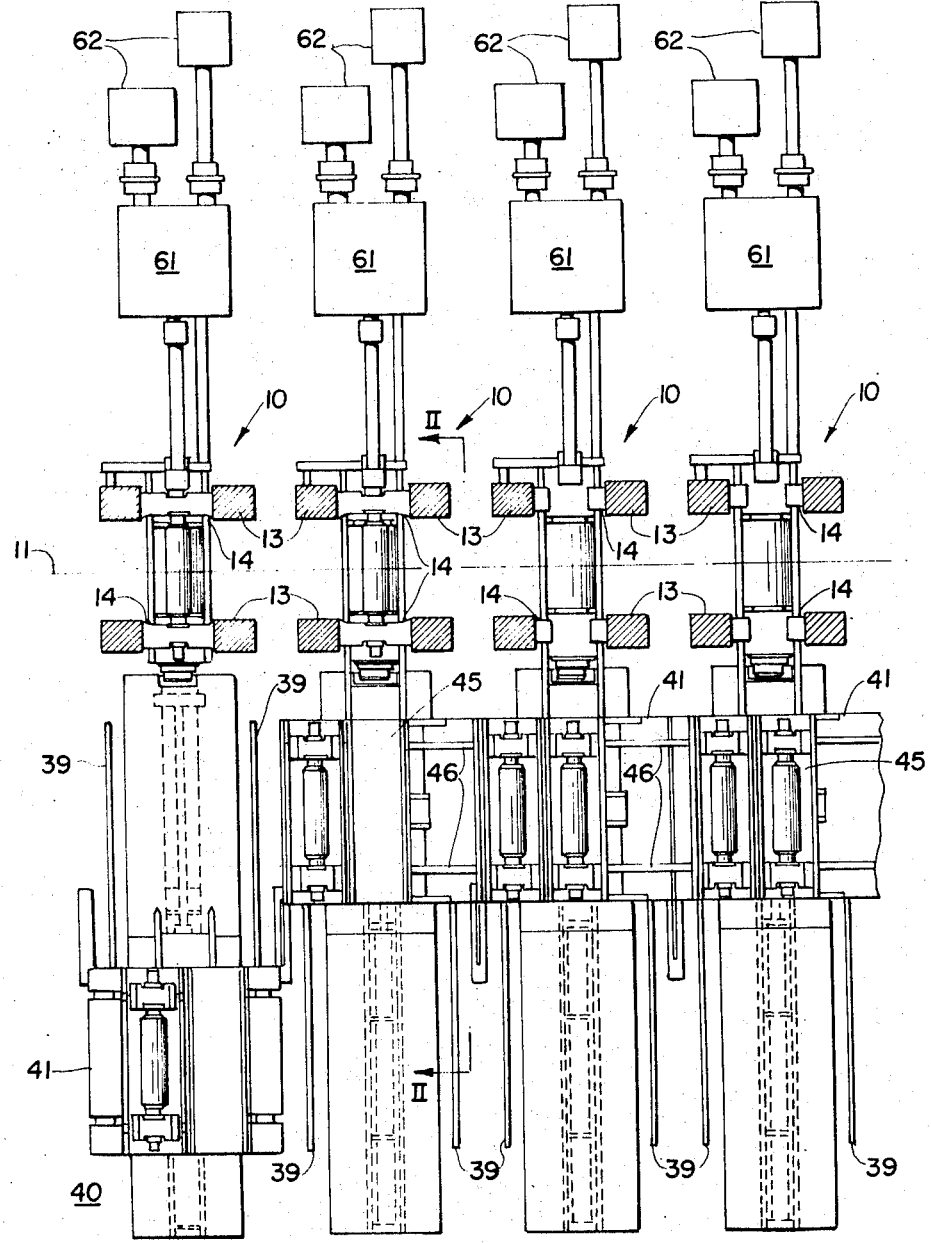
FIGURE 1 is a top plan view of a tandem mill incorporating the roll changers of our invention.

Referring to the drawings we have illustrated a plurality of successive four high mill stands 10 in tandem having a pass line 11 therethrough. Each mill stand has a housing 12 with end frames 13 on each side of the pass line. Each end frame 13 is provided with a window 14 carrying chocks 15 and 16 for upper and lower back up rolls 17 and 18 and chocks 19 and 20 for upper and lower work rolls 21 and 22. The upper work roll chock 19 is provided with spaced depending legs 23 which nest around lower work roll chock 20. Lower work roll chock 20 is mounted on wheels 24, 25 at each side. Wheels 24, 25 are adapted to run on rails 26 which extend through the mill stand and are supported on opposite sides of windows 14 on a piston 27 movable in a cylinder 28 fixed in end frame 13. The rails 26 are vertically movable in windows 14 by introducing fluid into cylinder 28 through inlet line 29 from a source of fluid pressure (not shown) such as a hydraulic pump, an air compressor or the like well known source of fluid under pressure. The bottom back up roll chock is locked in place by horizontally movable clamps 30 actuated by toggle link 31 and a rotatable shaft 32 mounted on the end frame. The upper back up roll is locked in place by a like clamp arrangement. The upper and lower work roll chocks 19 and 20 are locked in place as a single unit by horizontally movable clamps 33 actuated by toggle link 34 and by shaft 35 journaled in the housing.

A pair of spaced apart rails 39 are provided on the mill floor from a roll storage area 40 to mill stand 10, each pair of rails being normal to the pass line and extending to a point adjacent the mill stand. A roll transfer car 41 is movable on rails 39 by means of wheels 42 driven by motors 43 in the car. Each roll transfer car 41 is provided with a track 44 parallel to the pass line and normal to rails 39. Each car 41 is also provided with a cantilevered rail bridge 41a extending toward the mill housing and carrying rails 41b aligned with rails 26 of the mill housing. A buggy 45 is movable on the track 44 on wheels 46. The buggy 45 is provided with two sets of parallel rails 47 and 48 each pair corresponding in spacing to the rails 26 in the mill housing. The buggy 45 is movable from one position in which one set of rails 47 is aligned with rails 41b to a second position in which the other set of rails 48 is aligned with rails 41b on the rail bridge 41a. Movement of buggy 45 is accomplished by means of screw 50 driven by motor 51 through gear box 52. The screw 50 engages a nut 53 depending from buggy 45 intermediate its sides.

A roll pusher rod 60 is provided on the side of the roll housing 11 opposite rails 39 and on the same side as mill drive gears 61 and motors 62. A connecting knuckle or hook 63 is provided at one end of rod 60 adapted to engage a knuckle or hook 64 on one work roll chock. The opposite end of rod 60 forms the piston of a hydraulic cylinder 65 adapted to move the cylinder through the mill housing to push the work rolls out of the housing onto buggy 45 or alternatively draw the work rolls from buggy 45 into the housing.

Figure 2:
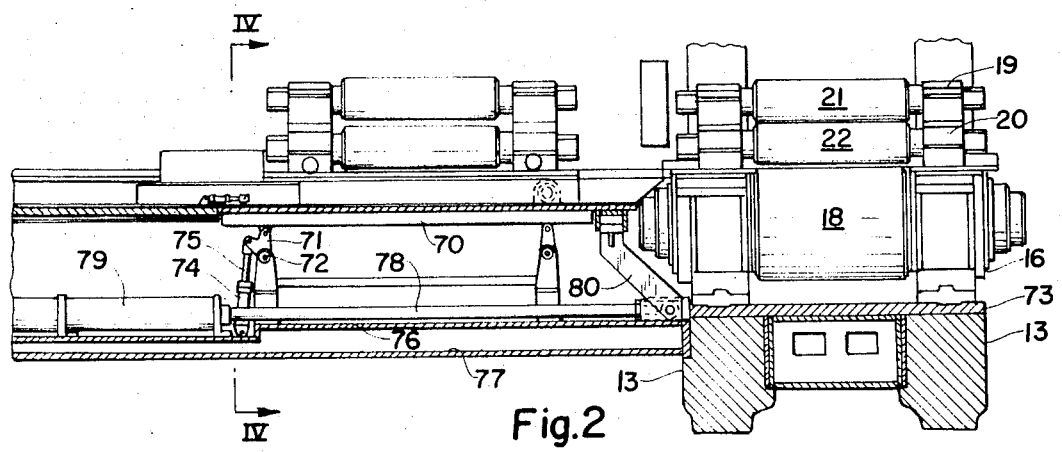
FIGURE 2 is a sectional view on the line II—II of FIGURE 1, partly broken away, of a roll changer according to our invention.
Figure 3:
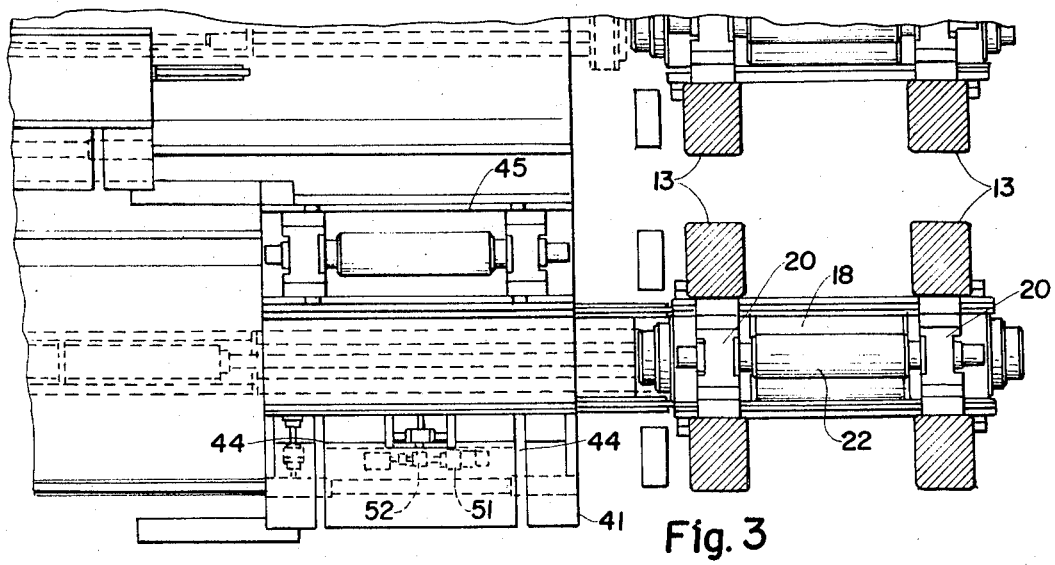
FIGURE 3 is an enlarged top plan view, broken away, of a roll changer according to FIGURE 1.
Figure 4:
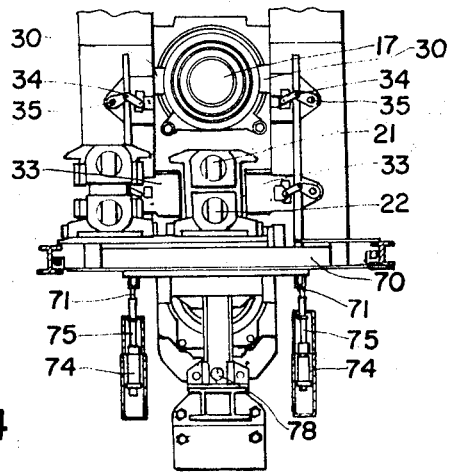
FIGURE 4 is a section on the line IV—IV of FIGURE 2.
Figure 5:
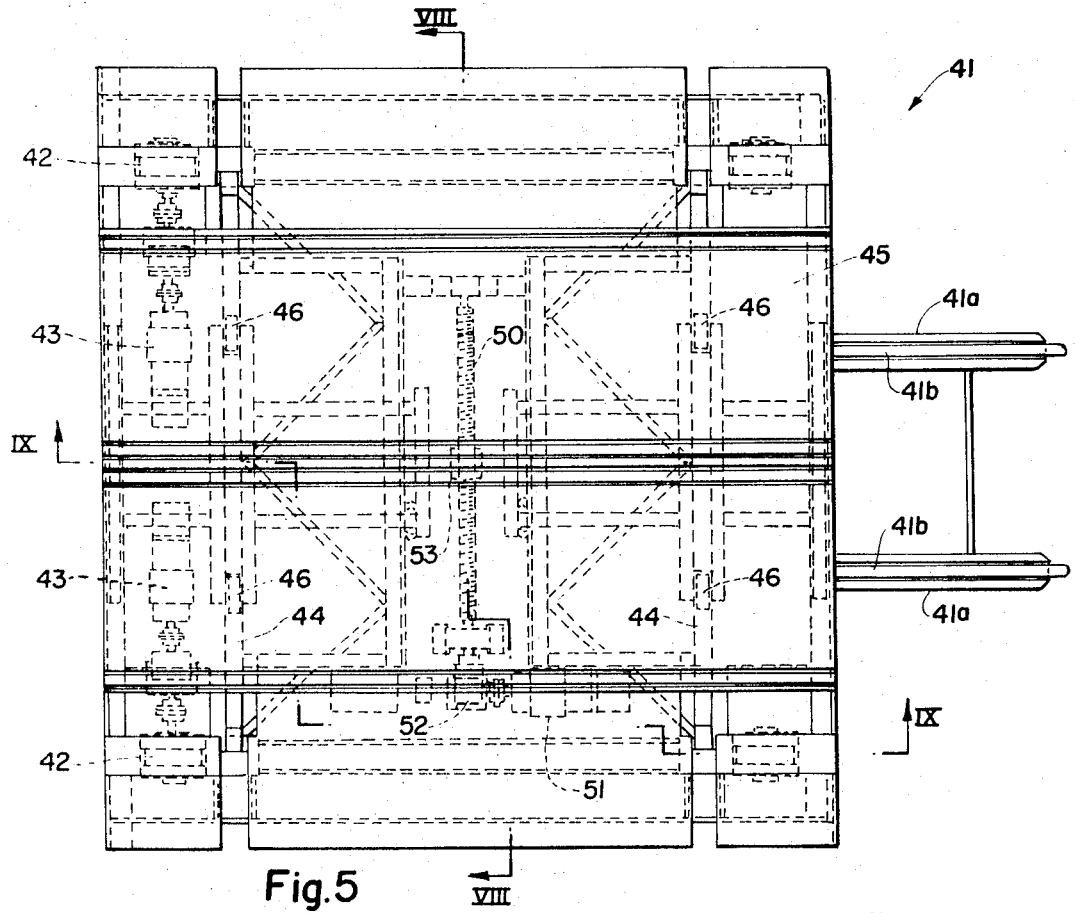
FIGURE 5 is a top plan view of a roll transfer car as used in the roll changer of FIGURE 1.
Figure 6:
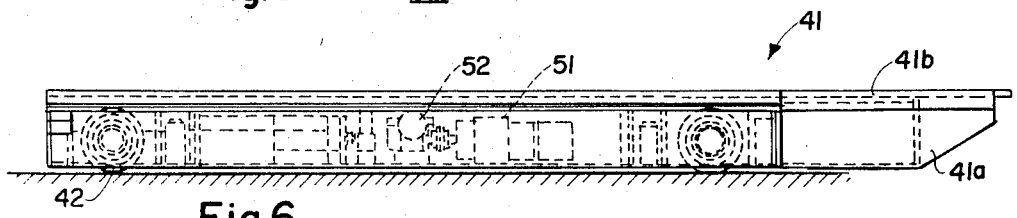
FIGURE 6 is a side elevation of the transfer car of FIGURE 5.
Figure 7:
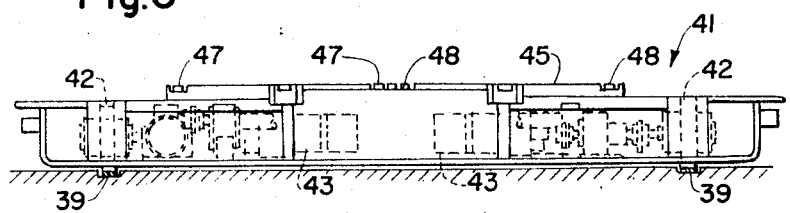
FIGURE 7 is an end elevation of the transfer car of FIGURE 5.
Figure 8:
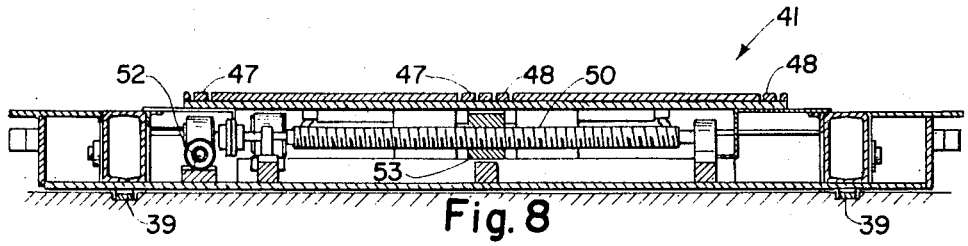
FIGURE 8 is a section on the line VIII—VIII of FIGURE 5.
Figure 9:
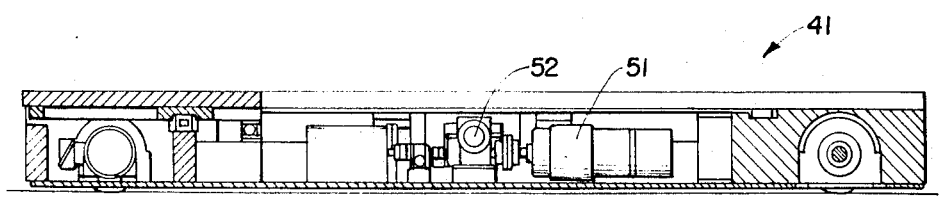
FIGURE 9 is a section on the line IX—IX of FIGURE 5.
Figure 10:
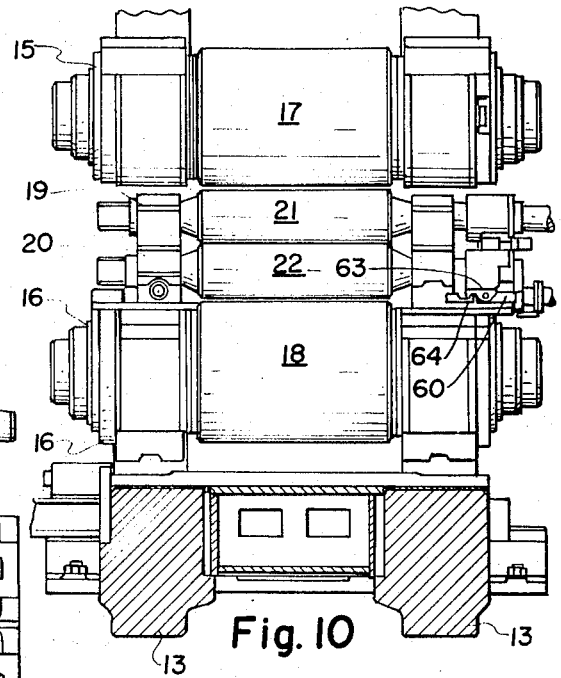
FIGURE 10 is a vertical fragmentary section, partly broken away, of a roll housing incorporating the roll pusher assembly of FIGURE 1.
Figure 11:
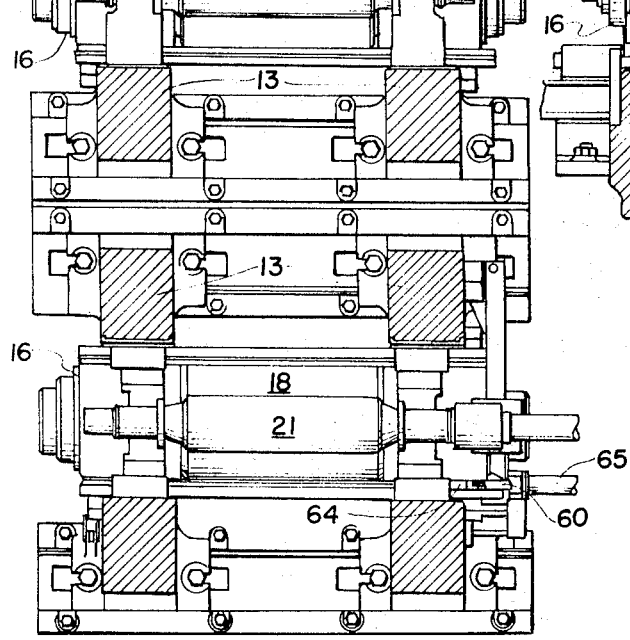
FIGURE 11 is a fragmentary top plan view, partly broken away, showing the roll housing and roll pusher assembly of FIGURE 1.

In order to provide access to permit removal of the lower back up roll, a segment of mill floor 70 is mounted on one arm of bell cranks 71 pivoted at their mid-point on standards 72 mounted on truck 73 beneath the floor. Fluid cylinders 74 on truck 73 are provided with pistons 75 connected to the other arm of bell crank 71 to rotate them about the pivot on standard 72 to raise and lower floor segment 70. Truck 73 is movable on track 76 on the center line of the base 77 of mill stand 10 by means of piston 78 in fluid cylinder 79 beneath the mill floor. The piston 78 is connected to floor segment 70 by pivoted arm 80. In order to open the floor for removal of a lower back up roll, the bell crank 71 is pivoted counterclockwise (FIGURE 2) to lower the floor segment 70 beneath the level of the main floor. The cylinder 79 is energized and piston 78 is moved to the left, viewing FIGURE 2, carrying with it floor segment 70 on arm 80.

In order to change the work rolls in any stand a set of upper 21 and lower 22 work rolls mounted in chocks 19 and 20 as previously described on wheels 24, 25 are placed on rails 47 or 48 on buggy 45 on roll transfer car 41 at roll storage area 40. The roll transfer car 41 is moved on rails 39 to the end frame of the mill stand with the rails 41b on rail bridge 41a in position to engage rails 26. Clamps 33 are released from the work roll chocks and cylinders 28 are filled with fluid to raise cylinders 27 and thereby rails 26 in alignment with rails 41b. The used work rolls are pushed onto the set of rails 47 or 48 other than the one carrying the new rolls by means of pusher rod 60. The knuckle 63 is released and buggy 45 is moved on transfer car 41 parallel to the pass line by rotating screw 50 to align the set of rails 47 or 48 carrying the new rolls with rails 41b. The knuckle 63 is engaged with knuckle 64 on the roll chocks of the new set of rolls and rod 60 is then drawn back to carry the new rolls onto rails 26. Fluid is released from cylinders 28 to lower chocks 19 and 20 in window 14 and clamps 33 are engaged against the chocks. The mill is now ready to operate. The roll transfer car 41 is, in the meantime, returned to roll storage area 40 where the used work rolls are removed and replaced with new rolls preparatory to the next roll change. This sequence of operations is illustrated in FIGURE 1.

While we have illustrated and described a presently preferred embodiment of our invention in the foregoing disclosure, it is to be understood that this invention may be otherwise embodied within the scope of the following claims.

We claim:

1. A rolling mill comprising a housing, end frames in said housing on opposite sides of a pass line, said end frames having windows therein, a pair of work rolls journaled in chocks movable in said windows, a pair of back up rolls journalled in chocks, clamp means on said end frames adapted selectively to engage said chocks to hold them immovable in said window, a pair of spaced rails extending from the window on one end frame to the window of the opposite frame, roll carriers movable on said rails beneath and supporting the work roll chocks in each window, means in said housing for moving said rails vertically with respect to the pass line, track means adjacent the housing parallel to said pass line, buggy means on said track means movable thereon, two sets of spaced rails on said buggy means, each set corresponding in spacing to the rails in said housing, means on said buggy moving said buggy from at least a first position in which one set of rails thereon is aligned with the rails in the housing to a second position in which the other set of rails thereon is aligned with the rails in the housing, roll moving means engageable with said rolls to move them between a position within said housing to a position on one of the two sets of rails on the buggy, said buggy and tracks being mounted on a roll transfer car movable from a roll storage position spaced from the mill housing to a position adjacent said housing on rails extending transversely of the pass line, a pit adjacent the mill housing, a movable floor member over said pit carrying a section of the transverse rails, and means moving said floor member in a direction transverse to the pass line parallel to the rails to cover and uncover said pit while simultaneously moving the lower back-up roll into and out of the housing.

2. A rolling mill as claimed in claim 1 wherein the movable floor member is simultaneously lowered below the surrounding floor level and moved in a direction transverse to the pass line parallel to the rails to uncover said pit.

References Cited

UNITED STATES PATENTS

| | | | |
|---|---|---|---|
| 3,312,096 | 4/1967 | Stubbs et al. | 72—238 |
| 3,323,345 | 6/1967 | Lyle et al. | 72—239 |
| 3,376,724 | 4/1968 | Wolfendale et al. | 72—239 |

CHARLES W. LANHAM, *Primary Examiner.*

B. J. MUSTAIKIS, *Assistant Examiner.*